United States Patent [19]

McCubbrey

[11] Patent Number: 4,484,349

[45] Date of Patent: Nov. 20, 1984

[54] PARALLEL PIPELINE IMAGE PROCESSOR

[75] Inventor: David L. McCubbrey, Ann Arbor, Mich.

[73] Assignee: Environmental Research Institute of Michigan, Ann Arbor, Mich.

[21] Appl. No.: 357,022

[22] Filed: Mar. 11, 1982

[51] Int. Cl.³ .......................... G06K 9/54; G06K 9/60
[52] U.S. Cl. ........................................ 382/49; 382/41; 382/27
[58] Field of Search ............... 382/49, 27, 41, 19, 382/16

[56] References Cited

U.S. PATENT DOCUMENTS

| | | | |
|---|---|---|---|
| 3,106,698 | 10/1963 | Unger | 382/41 |
| 4,174,514 | 11/1979 | Sternberg | 382/49 |
| 4,215,401 | 7/1980 | Holsztynski et al. | 382/41 |
| 4,224,600 | 9/1980 | Sellner | 382/41 |
| 4,395,699 | 7/1983 | Sternberg | 382/49 |
| 4,395,700 | 7/1983 | McCubbrey et al. | 382/49 |

Primary Examiner—John C. Martin
Assistant Examiner—Michael D. Parker
Attorney, Agent, or Firm—Krass & Young

[57] ABSTRACT

A plurality of serial neighborhood transformation pipelines are provided for simultaneously operating on adjacent segments of a partitioned image matrix. Techniques are disclosed for bi-directionally transferring pixel data on the edges of adjoining segments of the image matrix between adjacent processors in a manner which minimizes the number of interconnections therebetween. In such manner a parallel pipeline image processing system can be implemented in integrated circuit form while keeping the number of pins for each stage in the pipeline to a minimum.

10 Claims, 3 Drawing Figures

PARALLEL PIPELINE IMAGE PROCESSOR

TECHNICAL FIELD

This invention relates to image processors. In particular, it involves a high speed serial neighborhood transformation processor that operates on separate segments of a partitioned image matrix.

BACKGROUND ART

Neighborhood image processors are a class of devices that operate upon a first array or matrix of pixels to generate a second transformation matrix in which each pixel has a value depending upon its value in the original matrix and the values of its surrounding or neighboring pixels in the original matrix. These neighborhood processors are extremely useful devices and find particular utility for pattern recognition, image enhancement, area correlation, automatic inspection systems and other similar image processing functions.

In general, two diametrically opposite approaches have been taken to construct these special purpose neighborhood processors. One form is known as a parallel array processor in which there is a single computing element or module for each pixel. Parallel array neighborhood processors of this type are disclosed in U.S. Pat. No. 3,106,698 to Unger and various papers relating to the Illiac III pattern recognition computer. Generally, these parallel array processors comprise a matrix of identical processing modules, each module including a memory register for storing the value of a single pixel and a neighborhood logic translator for computing the transformed value of that pixel as a function of the present value of the pixel and its neighbhoring pixel values. Parallel connections are necessary between the translator for each module and all of the neighboring memory registers.

The principal advantage of these parallel array processors is speed. The transformation of the entire image matrix is performed substantially simultaneously. The principle disadvantage of the parallel array processor configuration is complexity since this construction requires one processing module for each pixel in the image matrix. In most practical applications the matrix size must be relatively large in order to achieve high resolution. For example, when the input matrix is generated by a state of the art television pick-up tube it may be digitized into a matrix of up to about 1,000×1,000 pixels. Accordingly, a parallel array processor would require one million relatively complex processing modules. The construction of such a parallel array processor is accordingly very costly.

A serial neighborhood processor represents an alternative approach to parallel array neighborhood processors. Examples of serial neighborhood processors are disclosed in U.S. Pat. No. 4,167,728 to Sternberg, U.S. Pat. No. 4,290,049 to Sternberg et al., and U.S. Pat. No. 178,312 to Sternberg et al. These patents and application are hereby incorporated by reference. Disclosed therein is a system which employs a chain or pipeline of individually programmable serial neighborhood transformation stages. Each stage is capable of generating the transformed value of one pixel within a single clock pulse interval. The output of each serial neighborhood transformation stage occurs at the same rate as its input. This allows the output of one stage to be provided to the input of a subsequent stage which may perform different neighborhood logic transformations. Each stage thus performs one transformation over the entire image in contrast with the parallel array processor technique which requires one processing stage for each pixel in the image. One of the tradeoffs, however, with the serial neighborhood processing approach is speed since each pixel and its neighbors must be sequentially presented to the neighborhood transformation logic circuit one at a time. Other examples of serial neighborhood processors are disclosed in U.S. Pat. No. 3,805,035 to Serra and in Kruse's article entitled "A Parallel Picture Processing Machine", IEEE Transactions on Computers, Vol. C-22, No. 12, Dec. 1973.

Sternberg, in his U.S. Pat. No. 4,174,514 (hereby incorporated by reference) and Kruse in his article recognize that the speed of serial neighborhood processors could be increased by partitioning the image matrix. In Sternberg's approach the image matrix is partitioned so that contiguous segments of the image could be processed simultaneously by two or more adjacent serial neighborhood processors. Sternberg also realized that provision had to be made in this partitioning scheme to bi-directionally transfer pixel data between adjacent serial neighborhood processors. This transfer becomes necessary when the neighboring pixels of the pixel being transformed in one processor is contained in the image matrix segment supplied to the other processor.

SUMMARY OF THE INVENTION

The present invention is directed to improvements to the broad concepts disclosed in the aforementioned U.S. Pat. No. 4,174,514. In particular, it is the object of this invention to provide a method and apparatus for transferring selected pixels between adjacent processors in a partitioned serial neighborhood processing system in such a manner so as to minimize the number of connections between adjacent processors. By minimizing the number of connections a partitioned serial neighborhood processing system can be more easily implemented in integrated circuit form. Those skilled in the art will appreciate that the number of pin connections is of substantial concern when implementing devices in integrated circuit form. One of the primary advantages of Sternberg's serial neighborhood processors is that each stage is substantially identical and thus can be mass produced in integrated circuit form at minimal cost. If too many pin connections are required the cost advantage over parallel array processors is reduced. However, the present invention permits integrated circuit fabrication of each stage in such a manner that the stages can be configured in a partitioned serial neighborhood processing system to achieve a great increase in speed at comparatively low increase in fabrication cost.

The present invention contemplates transferring those pixels lying on the edges of the partitioned image matrix to adjacent processors before the pixel data is stored in the neighborhood window registers of each stage for processing. This approach requires only one pixel transferring connection between adjacent processors in a partitioned serial neighborhood processing system. Preferably, some means is provided for keeping track of the pixel positions as they are initially fed into each stage. In the preferred embodiment, an address counter is used for this purpose. When the contents of the address counter indicates that a pixel being fed into a stage is also necessary for performing a neighborhood transformation in an adjacent stage, control logic is activated to effect the transfer of that pixel to the other stage.

In the preferred embodiment the partitioned data matrix is fed into the stages in a line by line raster. By appropriately delaying the lines being fed to adjacent stages, the simultaneous cross-wise transfer of pixel data to a given stage can be avoided and a single bi-direcitonal bus (for multi-bit pixels) can be used to effect the transfer between adjacent stages.

DESCRIPTION OF THE DRAWINGS

Still other objects and advantages of the present invention will become apparent to one skilled in the art upon reading the following specification and by reference to the drawings in which.

DESCRIPTION OF THE PREFERRED EMBODIMENT

Figure 1:
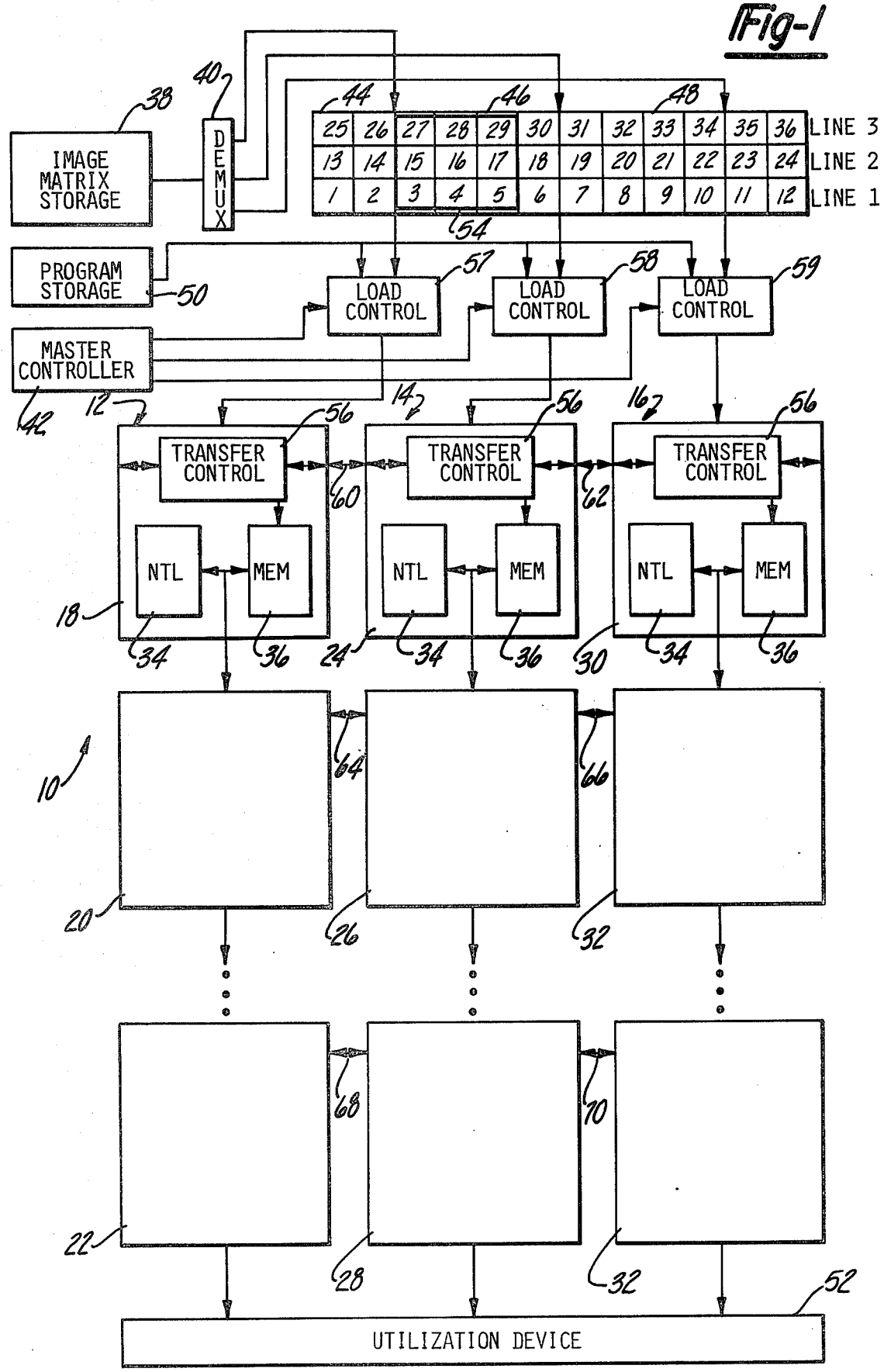
FIG. 1 is a block diagram of one embodiment of a parallel partitioned serial neighborhood image processing system in accordance with this invention.

The present invention envisions the use of two or more pipelines of serial neighborhood processing stages. In FIG. 1 image processing system 10 is shown with three pipelines 12, 14 and 16. However, it should be understood that this should not be construed as being a limited example since the number of pipelines can be increased or decreased depending upon the speed factor desired. Similarly, the length or number of stages in each pipeline may vary depending upon the types of transformation algorithms that the system is designed to process.

Figure 2:
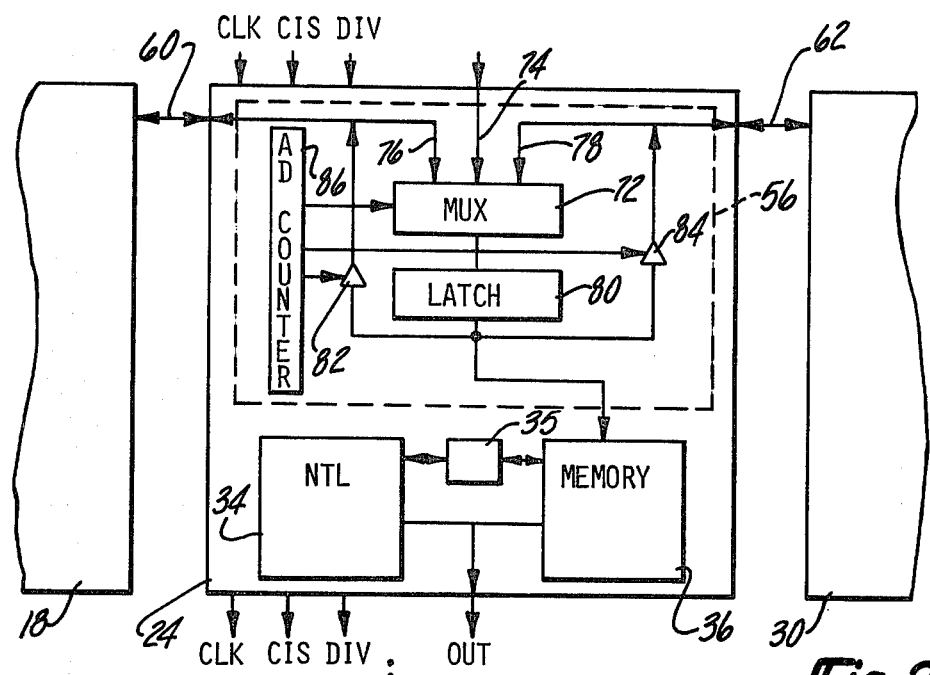
FIG. 2 is a schematic diagram of one of the stages of the system shown in FIG. 1.

Each of the stages 18–32 is substantially identical from a hardware standpoint. Each stage includes neighborhood transformation logic 34 which operates to generate a transformed output value as a function of the value of each pixel and the values of its neighboring pixels in the image matrix being processed. All of the neighborhoods in the image matrix are sequentially extracted by an array of neighborhood window registers making up neighborhood extraction means 35 (FIG. 2). The central pixel in each neighborhood is transformed according to preprogrammed criteria, and then sent to the input of the next stage. The method by which the neighborhoods are extracted for examination and transformation may vary somewhat. The aforementioned Sternberg patents and patent application illustrate alternative approaches, the approach disclosed in the patent application being generally followed in the description of the present invention. In this approach a memory 36 serves as a recirculating line buffer for temporarily storing a given number of scan lines of pixel data of a given length as well as program instructions defining the transformation criteria used by the neighborhood transformation logic 34. Pixel data for each neighborhood is loaded from memory 36 into the array of window registers in the neighborhood extraction means 35 where they are operated upon by transformation logic 34 and then discarded.

In the present invention the image matrix to be processed is partitioned or divided into three contiguous portions for processing by pipelines 12, 14 and 16, respectively. The original image matrix is stored in a high speed memory device 38 such as a disc or tape. Alternatively, the matrix may be obtained directly from a scanning device such as a TV camera. The original matrix is output in raster scan line format to a demultiplexor circuit 40 under the control of a master controller 42. Demultiplexing circuit 40 operates to divide each raster scan line into three different segments and load the divided segments into buffer storage devices 44, 46 and 48. The primary purpose of buffer devices 44–48 is to regulate the transfer of data between the high speed memory 38 and the pipelines 12–16 which may operate at a somewhat lower speed. To this end buffer storage devices 44–48 may comprise first-in-first-out (FIFO) shift registers. Each shift register would be at least as wide as the line length for the matrix segment to be processed by its respective pipeline. In addition, the buffer devices 44–48 should be able to contain at least two continguous lines for the reasons that will become apparent later herein.

By partitioning the original image matrix in such a manner, each of the pipelines 12, 14 and 16 can operate substantially simultaneously on their respective contiguous portions of the segmented matrix. Transformation criteria values defining the types of transformation to be carried out in each stage is loaded from a program storage medium 50 into each stage of the pipeline. The pixel data is then loaded into the first stage of each pipeline which performs its programmed transformation on its respective matrix segment. The outputs of the first stages 18, 24, 30 of the pipelines 12, 14 and 16, respectively, are coupled to the second stages 20, 26 and 31 and so on through the last stages 22, 28 and 32 in the pipelines. The output of the last stages can be coupled to a utilization device 52 for using the transformed matrix. Utilization device may be, for example, a robot or other device which is actuated by certain transformation outputs. Alternatively, the outputs of the last stages can be recycled through the pipelines for further processings or to external memory.

As noted above, each stage operates on a subset or window of pixels. In this example, system 10 operates on a 3×3 array of pixels represented by the window 54. It can be apreciated that when pipeline 12 is operating upon pixel 16 that its right-hand neighboring pixels actually belong to the segment fed to the pipeline 14. In fact, this problem occurs for each edge pixel to be processed by each pipeline. The present invention is particularly directed to a technique for assuring that each pipeline has access to the necessary pixels to perform a valid neighborhood transformation even though some of the neighboring pixels belong to matrix segments fed to adjacent pipelines. To this end, each stage includes transfer control circuitry 56 for bidirectionally controlling the transfer of edge pixels to and from each stage. Additionally, load control logic 57–59 is provided for controlling the timing of the pixel feed to each pipeline. An important aspect of this invention is that only one pixel transferring connection is required to transfer pixel data between adjacent stages in the pipeline. In the embodiment shown in FIG. 1 there is one pixel transferring connection 60 between the stages 18 and 24 and one connection 62 between stages 30 and 24. It will be appreciated that the left and right-hand pipelines 12 and 16 need only receive pixels from the right and left edges of the matrix segment supplied to the middle pipeline 14 whereas the middle pipeline 14 needs to obtain edge pixels from both the left and right-hand segments supplied to pipelines 12 and 16. The number of lines for these connections (and hence, output pins in the IC package for each stage) will depend upon the number of bits per pixel position. In other words, if each pixel is represented by only one bit then only one line is required for each connection 60–70 whereas if each pixel is represented by eight bits then eight lines will be required. Hence, the term "pixel transfer connection" means the number of lines required to transfer all of the data associated with one pixel.

Turning now to FIG. 2, one embodiment of the transfer control circuitry 56 is shown in detail. A 3:1 multiplexer 72 accepts pixel data from three sources. One source is over line 74 which is coupled to the normal pixel data stream for the matrix segment supplied to that stage. Another input is over line 76 which supplies pixel data from the left-hand stage (here stage 18) and a third input is over line 78 from the right-hand stage (here stage 30). The output of multiplexer 72 is connected to a latch 80 whose output is connected to the input of memory 36. Hence, pixel data from any of the three input lines 74, 76 and 78 may be loaded into memory 36 via latch 80 for processing by the neighborhood transformation logic 34.

Pixel data in latch 80 may also be transferred out of the stage to either of the adjacent left or right-hand stages. The transfer of pixel data to the left or right is controlled by the states of tri-state buffers 82 and 84, respectively. In such manner pixel data can be simultaneously loaded into memory 36 and also transferred to the left or right-hand stages. Means are provided for controlling multiplexer 72 and tri-state devices 82 and 84 as a function of the position of the pixels in the image matrix fed to the stage. In other words, some means must be provided for keeping track of the pixel position each line of image data being fed into the state. To this end, an address counter 86 may be used. Each stage includes control lines CIS and DIV, as well as a clock input CLK from master controller 42. Each pixel is fed into the stage during one clock time. Every time a new line of pixel data is fed into the stage one of the control lines (here, line DIV) changes state to indicate the beginning of a new line. As each new pixel is received the contents of the address counter 86 is incremented. In such manner it is possible to keep track of the position of the pixel being fed to or required to be fed to the stage.

Figure 3:
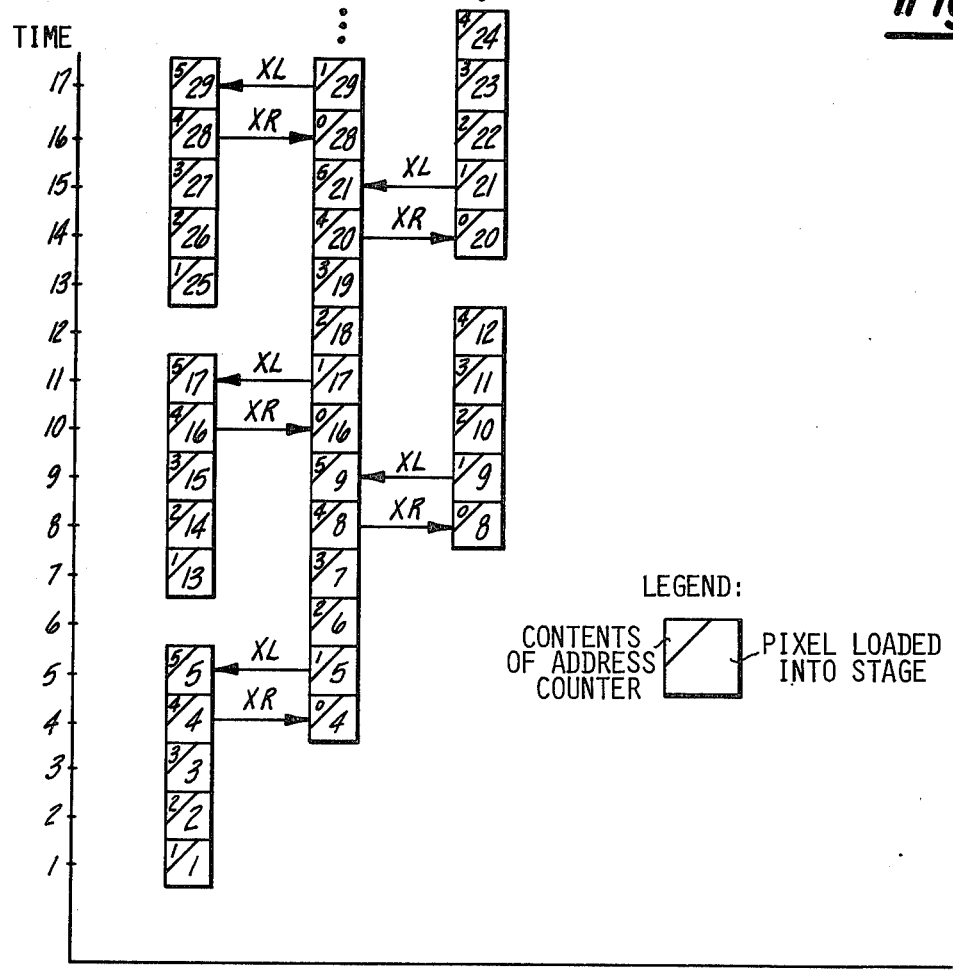
FIG. 3 is a timing chart illustrating the loading sequence of pixels into the parallel pipelines of the system.

The operation of the present invention will become apparent by way of the following simplified example. Assume that the line length of the original image matrix is 12 pixels wide and that the matrix has been segmented into three segments of four pixels in length as represented in FIG. 1. Reference to FIG. 3 also aids in understanding the operation of this invention. Each of the vertical columns of boxes are labeled according to the pixel number being loaded into the pipeline and the contents of the address counter 86 in the transfer control circuitry 56 of each stage. At time step 1 pipeline 12 begins to receive a new line of pixel data (here pixel 1). The address counter contents is thus represented in the triangle in the box as having the number 1. The next two time steps sees the loading of pixels 2 and 3 into stage 18. At time step four, the contents of address counter 86 is at 4 and the latch 80 contains pixel number 4. Note that pixel 4 lies on the edge of the segment being fed to pipeline 12 and is necessary for pipeline 14 to perform a neighborhood transformation. Consequently, it is necessary to transfer pixel number 4 to pipeline 14. This is accomplished by address counter 86 sending appropriate signals to enable tri-state device 84 such that the value of pixel number 4 is transferred over connection 60 to stage 24. The contents of address counter 86 in stage 24 will be at zero (or other predetermined count) since a new line of pixel data has not yet been fed from its memory segment source. Accordingly, address counter 86 in stage 24 couples line 76 through multiplexer 72 so that pixel number 4 may be loaded into memory 36 of that stage. At the next time step the address counters of stages 18 and 24 are incremented. At this time stage 18 needs to have pixel number 5 in order for it to perform valid neighborhood transformations. Accordingly, stage 24 activates tri-state device 82 to send pixel number 5 over connection 60 to stage 18. Stage 18 causes its multiplexer 72 to couple line 78 to latch 80 so that pixel number 5 can be loaded into its memory 36. It can be appreciated that stage 18 thus now contains all of the necessary pixels for that line.

At time step 6 load control 57 is caused to delay further transfer of pixel data into stage 18 for that time step. As will become apparent to one skilled in the art, the outer most pipelines in this partitioned scheme will only receive transferred pixel data from one adjacent inner stage whereas the inner stages of pipeline 14 requires pixel data from two of its outer adjacent stages. Consequently, in order to prevent a conflict, i.e. the need for simultaneous transfer of data between the stages on connections 60–70, the feeding of the pixel data must be delayed for one time step each time a new line is fed to the outer most pipelines. This delay function can be accomplished by a wide variety of devices and may, for example, take the form of a slave microprocessor or simply a suitable delay device controlled by master controller 42.

At time step 7, a new line of pixel data is fed to stage 18 whereas stage 24 continues to be loaded by pixels in the first line. At time step 8, pixel number 8 is loaded into the memory of stage 24 and also transferred to the right-hand stage 30 over connection 62. Again, the reason for this transfer is because the stages in pipeline 16 need the values of those pixels lying on the right hand segment fed to the middle pipeline 14 in order to perform valid neighborhood transformations. At time step 9, pixel number 9 is transferred to the left over connection 62 into the stage 24 of the middle pipeline 14.

This staggered loading process continues until the entire partitioned image matrix segments have been fed into the pipelines 12, 14 and 16. Reference to FIG. 3 will confirm the fact that bidirectional transfer described above may occur over a single connection without encountering a conflict. It can be appreciated that this technique has significant advantages over the particular example shown in the U.S. Pat. No. 4,174,514 Sternberg patent. In the disclosed example therein there are six separate connections to and from adjacent stages and, thus, requires a six fold increase in pin connections in comparison with the present invention. One of the major conceptual differences is that the pixel transfer is accomplished before the pixel values are loaded into the neighborhood extraction means for accessing each neighborhood for processing. According to the teachings of the present invention all of the pixel data necessary to perform each neighborhood transformation in each pipeline is already present and loaded in the correct sequence. Accordingly, there is no need to obtain the edge pixel values from the storage devices making up the neighborhood extraction means in the adjacent processors.

Once the pixel data has been loaded into the first stage of the pipeline in the manner described above, each pipeline performs its programmed neighborhood transformation on its respective image segment, with the transformed pixel data progressing through each stage in the pipeline. This parallel partitioned approach serves to increase the processing speed of a single serial neighborhood processing pipeline at the expense of a relatively minor increase in cost. It should be understood that while this invention finds particular utility for processing image data, it is also useful for analyzing a wide variety of other types of data which is represented as a matrix of values. Still other advantages and modifications of the present invention will become apparent to one skilled in the art after a study of the drawings, specification and the following claims.

I claim:

1. A method of analyzing a matrix of pixel values in a serial neighborhood processing system, said system being adapted for sequentially performing a neighborhood transformation on pixel values contained in an array of neighborhood extraction storage devices, said method comprising:
   partitioning the matrix into a plurality of segments;
   feeding contiguous segments to adjacent neighborhood transformation stages in a raster scan line format;
   sensing the relative position of each pixel in the lines fed to each stage;
   bi-directionally transferring pixels lying on the edges of each segment to adjacent stages over a single connection means before said pixels are loaded into the neighborhood extraction devices for processing; and
   then, loading neighboring pixel values into said neighborhood extraction devices for processing whereby each stage contains all of the neighboring pixels for performing said neighborhood transformations on the pixels fed to the stage even though some of the neighboring pixels were initially fed to adjacent stages.

2. The method of claim 1 wherein the feeding of each line of pixels to outer stages in the system is delayed by a suitable amount so as to prevent simultaneous transfer of pixels in a stage.

3. In a parallel partitioned serial neighborhood processing system having a plurality of pipelines of serial neighborhood transformation stages, adjacent pipelines being adapted to perform neighborhood transformations on contiguous segments of pixel data fed to each pipeline, wherein the improvement comprises:
   a single connection for pixel transfer between adjacent stages in the pipelines for bi-directionally transferring pixels lying on the edges of the segments fed to adjacent stages.

4. The improvement of claim 3 wherein each stage further comprises:
   transfer control means including multiplexer means for receiving pixel data from the matrix segment supplied to its pipeline and from said pixel transfer connections from adjacent stages in other pipelines, the output of said multiplexer means being coupled to neighborhood extraction means for temporarily storing a neighborhood of pixel values for processing and also being coupled to said pixel transfer connections; and means for sensing the relative position of the pixels in each segment line fed to the stage, operative to control the loading of the neighborhood extraction means through the multiplexer and transfer of pixels to adjacent stages through said pixel transfer connections.

5. A serial neighborhood transformation stage comprising:
   neighborhood extraction means for sequentially accessing a neighborhood of pixels in a matrix;
   transformation logic means for transforming each pixel in a matrix as a function of its value and surrounding pixel values contained in the neighborhood extraction means; and
   transfer control means up stream of said neighborhood extraction means, operative to receive and transfer selected pixels between other stages.

6. A parallel partitioned serial neighborhood processing system comprising:
   means for partitioning an image matrix into a plurality of contiguous segments;
   means for feeding contiguous segments to adjacent serial neighborhood transformation stages in a raster scan line format;
   said serial neighborhood transformation stages including neighborhood extraction means for sequentially accessing a central pixel and its surrounding pixels in the matrix, neighborhood transformation logic means for transforming the value of the central pixel as a function of its value and the values of its surrounding pixels contained in the neighborhood extraction means;
   a single connection for pixel transfer between adjacent stages;
   means for sensing the relative position of each pixel in the lines fed to each stage; and
   transfer control means for bi-directionally transferring pixels lying on the edges of each segment to adjacent stages over said pixel transfer connection before said pixels are loaded into the neighborhood extraction means for processing.

7. The system of claim 6 wherein said pixel transfer connection is an eight bit data bus.

8. The system of claim 6 wherein said transfer control means comprises:
   multiplexer means having a plurality of inputs, a first input being connected to said pixel transfer connection from a left-hand adjacent stage, a second input connected to the pixel transfer connection between a right-hand stage, and a third input being connected to a supply of pixels from the image segment fed to that stage;
   latch means connected to the output of said multiplexer means, the output of said latch being coupled to said neighborhood extraction means, to said left-hand pixel transfer connection through a first gate, and to said right-hand pixel transfer connection through a second gate;
   an address counter whose contents are a function of the relative position of each pixel in the lines fed to each stage; and
   wherein said address counter is utilized to control the multiplexer and first and second gates.

9. The system of claim 8 wherein said feeding means is operative to delay the feeding of each line of pixels to the outer stages by a suitable amount so as to prevent simultaneous transfer of pixels within a stage.

10. The system of claim 8 wherein each stage includes a memory connected between the output of the latch and the neighborhood extraction means, operative to store a given number of scan lines and sequentially load said neighborhood extraction means with neighboring pixels.

* * * * *